United States Patent

Gans et al.

[15] 3,662,268

[45] May 9, 1972

[54] DIVERSITY COMMUNICATION SYSTEM USING DISTINCT SPECTRAL ARRANGEMENTS FOR EACH BRANCH

[72] Inventors: Michael James Gans, New Shrewsbury, Monmouth County; Douglas Otto John Reudink, Colts Neck, both of N.J.

[73] Assignee: Bell Telephone Laboratories, Incorporated, Murray Hill, N.J.

[22] Filed: Nov. 17, 1970

[21] Appl. No.: 90,396

[52] U.S. Cl. ....................................325/56, 325/59, 315/154

[51] Int. Cl. ..........................................................H04b 1/02

[58] Field of Search....................325/56, 59, 154, 156, 3, 14, 325/51, 53, 54, 58, 65, 473, 479; 179/15 BP

[56] References Cited

UNITED STATES PATENTS 3,114,106 12/1963 McManus ................................325/56

*Primary Examiner*—Robert L. Richardson
*Assistant Examiner*—Kenneth W. Weinstein
*Attorney*—R. J. Guenther and E. W. Adams, Jr.

[57] ABSTRACT

The output of each branch of a diversity system contains a pilot signal and a modulated carrier. The spectrum of each branch output is distinct, but the difference frequency component between the signal and pilot is identical for all branches. The same intelligence is applied to each branch. In a unitary branch combiner, a single mixer performs all cophasing and combining. All of the pilot and carrier signals are beat together to produce in-phase addition of the difference components derived from the individual signal pairs, and the spectra are selected so that negligible interference is generated by cross modulation products.

17 Claims, 9 Drawing Figures

INVENTORS M. J. GANS
D. O. J. REUDINK
BY David L. [signature]
ATTORNEY

DIVERSITY COMMUNICATION SYSTEM USING DISTINCT SPECTRAL ARRANGEMENTS FOR EACH BRANCH

BACKGROUND OF THE INVENTION

This invention relates to diversity transmission systems, and more particularly, to systems utilizing a pilot and a modulated carrier in the same phase coherent bandwidth.

Communication systems using pilots and steerable antenna arrays are well known. In two representative United States Patents, U.S. Pat. No. 3,273,151, issued to C. C. Cutler et al. in 1966 and U.S. Pat. No. 3,166,749, issued to J. C. Schelleng in 1965, the received pilot and modulated signal in each branch are beat together to produce a difference product which is free from phase distortion due to the transmission medium. It is taught in Cutler et al. that the difference frequency modulation component resulting from beating a pilot and a modulated signal received by a given antenna element of an array is in-phase with all other parallel components derived by the other antenna elements and that these products can be combined additively. In the prior art the beating technique is used to produce for each branch an individual produce which is in-phase with all others. Each diversity branch is electrically isolated prior to cophasing.

In many applications the necessity of individual and isolated mixers for each branch results in cost and complexity sufficient to preclude the use of the technique. For example, mobile radio systems, suitable for large subscriber population, require simple, efficient and inexpensive apparatus at the mobile station.

SUMMARY OF THE INVENTION

It is the object of the present invention to improve the pilot-carrier diversity systems so that the electrical isolation of the branches is eliminated and so that a simple mixer can beat the components of all branches simultaneously.

In order to simplify the system to a single mixer, the inherent interference caused by modulation products (originating from signals in other branches) must be eliminated or suppressed. In accordance with the invention, the spectral arrangement of all of the pilots and carriers is specifically selected so that undesired products are either out of the desired passband or are so weak relative to the desired signal that they can be conveniently suppressed.

The transmission on each branch contains a pair of signals which may be an unmodulated pilot and a modulated carrier. Alternatively, the modulation may be divided between a carrier and a pilot (i.e., two modulated carriers). The composite spectrum of each branch must be within the same phase coherent bandwidth and the spectra of all branches may occupy one common band, separated bands, or overlapping bands. In all cases the signal pairs must be chosen so that the difference frequency components between the two signals of any one branch are identical for all branches; as used herein difference frequency component means that signal produced by mixing two signals to form a difference frequency output, and two signal pairs have identical difference frequency components when the difference product of the two signals of each pair would produce voltages which are identical functions of time except for a multiplicative constant. The spectra must be arranged to minimize the number of cross modulation products which lie within the desired output band, especially those which add in-phase. All of the input pairs are mixed together and the difference frequency components derived from a pilot and carrier pair on one branch will add in-phase with the corresponding difference frequency components of all other branches at all times, thus providing predetection maximal ratio combining. The difference frequency components resulting from mixing signals on different branches add with random phase. The interfering products which are out-of-band are filtered out. The in-band products, which are produced by random phase combinations, are weak relative to the desired products, and in f.m. systems, the index is selected so that they are suppressed by the f.m. characteristic known as capture effect.

The system may utilize a space diversity array at the transmitter and a single antenna, single front end receiver in which all inputs are combined in a conventional mixer or squarer. The spectral arrangement technique, however, is also capable of separating pairs of appropriately arranged signals in other environments. For example, in a diversity array receiver having the pilot-carrier pair received by each antenna, the reception on each branch could be individually shifted in frequency to form an appropriate spectral arrangement so that when the shifted outputs are beat in a common mixer a coherent combined output is produced.

DETAILED DESCRIPTION

Figure 1:
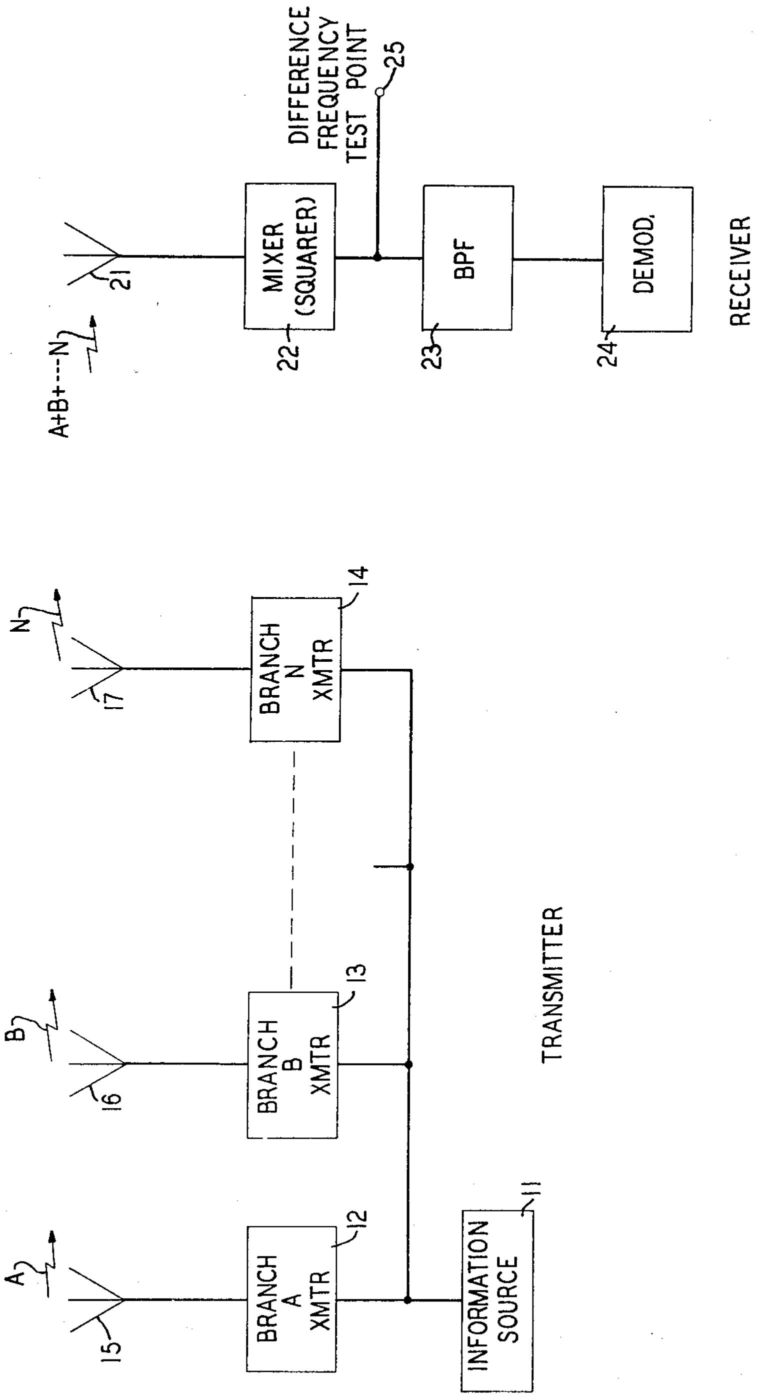
FIG. 1 is a block diagram of an N-branch transmitter diversity system for use in accordance with the invention.

The diversity transmission system in accordance with the present invention is illustrated in block diagram form in FIG. 1. The elements of the system include a multiple branch transmitter and a unitary branch receiver. Information source 11, which may be any conventional device, such as a microphone, provides an intelligence bearing signal. The single intelligence signal is applied to each of the plurality of branches A through N via independent branch transmitters 12 through 14. Each branch transmitter generates a distinctive pair of signals consisting of a pilot tone and a carrier whose difference frequency component is identical for each branch. Branch transmitters 12 through 14 may each include two conventional C.W. transmitters, one generating the pilot and the other generating the carrier, and a modulator for applying the intelligence from source 11 to each carrier. (In some cases, two modulators are included so that portions of the intelligence may be modulated onto each signal). The branches are shown as originating from separate antennas 15 through 17 arranged in a space diversity array, but the array may also represent an antenna system employing frequency, angle, polarization, time or path diversity. The pilot and carrier frequencies, as well as the placement of modulation, is specifically arranged so that the frequency spectra of the transmission from each branch will create negligible interference if all of the components are mixed together.

All of the signal pairs are received by single antenna 21. The pilots and carriers of all branches are beat together by mixer 22 which is a conventional mixer designed to produce a difference frequency output. The difference frequency component derived from the pilot and carrier of one pair contains intelligence identical to that contained by the difference components derived from all other pairs. Since mixer 22 provides multiplication of a pilot and carrier of the same pair, the mixer is also designated squarer. This "squaring" inherently weights each branch relative to its signal strength and provides maximal ratio diversity if noise times noise products are neglected.

The intelligence transmitted via each different diversity pair appears at the output of mixer 22, modulated on a common i.f. carrier which is at the difference frequency. The signal and pilot on each branch share a phase coherent bandwidth, and therefore, the difference frequency component produced at the receiver by mixing the pilot and signal of the same branch is identical to the difference frequency component between that signal and pilot at the transmitter. Transmitters 12 through 14 are tuned so that each pair has the same difference frequency component, and therefore all of the difference frequency components containing the desired signal are in-phase and may be combined directly. The intermodulation products also produce components which are not always in-phase, such as the products of two pilots or a pilot and modulated carrier not of the same pair. The desired products, as well as these undesired ones, may be sensed at difference frequency test point 25.

Distinct spectra are generated by each transmitter 12 through 14 to ensure that some interfering products are outside the passband of the in-phase signals. These out-of-hand signals are filtered out by bandpass filter 23 which is designed to pass only the desired difference frequency and its modulation band. Those interfering products which are within the passband are, due to the choice of spectra, weak relative to the desired products and do not interfere significantly with the detection of the intelligence by demodulator 24. Two spectra are considered to be distinct even though plots of their spectral power densities are identical if their instantaneous voltages are different functions of time, as would be caused, for instance, by two waves, one delayed relative to the other. Any form of modulation may be employed but in the case of frequency modulation, demodulator 24 may be used to improve the signal-to-interference ratio by appropriate selection of the f.m. index so that the undesired products will be suppressed by the capture effect of the f.m. detector.

The following spectral arrangements are four illustrative examples of the numerous possible arrangements of pilot and carrier pairs which may be utilized in accordance with the invention to maintain separation between diversity branches. Each pair must have a common difference frequency component, and the pilot and carrier of each pair must share a common phase coherent bandwidth. The spectra of all of the branches must be selected so that interfering signals are significantly removed in frequency or power from the desired signal. The power levels of the pilot and carrier of a pair may be equal or unequal, their relative powers being chosen to enhance either the signal-to-interference ratio or the signal-to-noise ratio.

1. TWO BRANCHES HAVING COMMON TRANSMISSION BAND WITH REVERSED SPECTRA

Figure 2A:
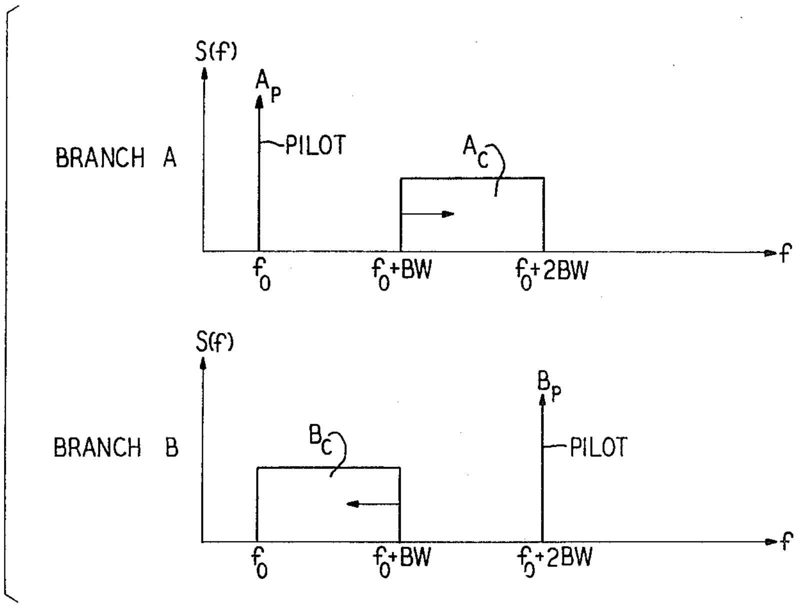
FIGS. 2A, 3, 4A and 5 are graphical representations of four exemplary spectral arrangements of output transmissions from the transmitter array in FIG. 1.

The most basic diversity system utilizes only two branches, and an appropriate spectral arrangement of the transmission in these two branches is shown in FIG. 2A, where $S(f)$, the power spectral density, is plotted against frequency. The branches are designated A and B as in the system of FIG. 1. The frequency spectrum of the channel A output consists of a pilot $A_p$ at frequency $f_o$ and a modulated carrier $A_c$ extending from $f_o$+BW to $f_o$+2BW. Conversely, the spectrum of branch B consists of a pilot $B_p$ at $f_o$+2BW and a modulated carrier $B_c$ between $f_o$ and $f_o$+BW. This spectral arrangement ensures that the difference frequency component produced by mixing the pilot and carrier of branch A is the same as the difference frequency component of the pilot and carrier of branch B.

The same intelligence is modulated in any conventional manner on the two carriers and if frequency modulation is employed, carrier $B_c$ sweeps downward in frequency as carrier $A_c$ sweeps upward (as indicated by the arrows). The spectra transmitted from branches A and B both lie within the frequency range $f_o$ to $f_o$+2BW, but their arrangement is reversed so that the receiver may cophase the two signals simultaneously without processing them through separate circuits.

Figure 2B:
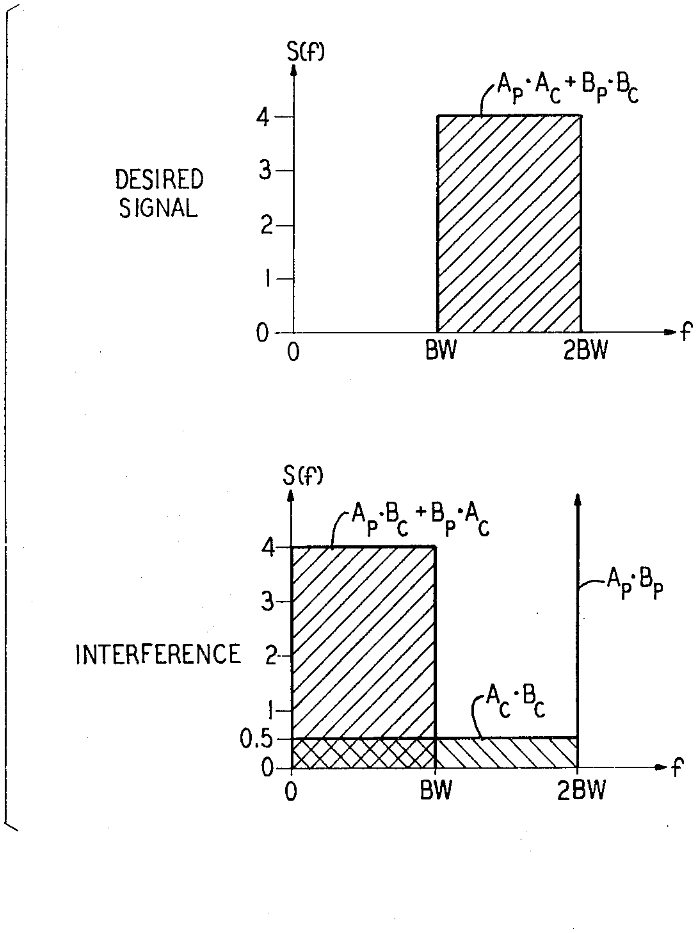
FIGS. 2B and 4B are graphical representations of the numerous cross modulation products as seen at the difference frequency test point of the receiver in FIG. 1 for the transmitted spectra illustrated in FIGS. 2A and 4A, respectively.

Intermodulation products produced by mixer 22 in the receiver are illustrated in FIG. 2B. The desired signal component is the combination of the difference frequency product obtained when pilot $A_p$ mixes with modulation $A_c$ and pilot $B_p$ mixes with modulation $B_c$, as represented by: $A_p \cdot A_c + B_p \cdot B_c$. The desired components produced by mixing a pilot and modulation of the same channel always add in-phase if the transmission bandwidth, which is twice the signal bandwidth BW, is within the phase coherent bandwidth of the propagation medium. Because of this phase coherent addition and since each modulation band is multiplied by the strength of its own pilot, the receiver performs as a maximal ratio diversity combiner.

The power spectral densities, $S(f)$, shown in FIG. 2B are normalized to the power spectral density of the difference frequency spectrum that would be obtained if only a pilot and carrier from one transmitter were received. The dc components produced by mixer 22, such as $A_p \cdot A_p$, $B_p \cdot B_p$, $A_c \cdot A_c$, $B_c \cdot B_c$ are neglected since they are easily filtered from the output. Interference components are illustrated for the worst conditions, that is, when the strength of signals from both transmitters are equal and when the phase of the interfering components $A_p \cdot B_c$ and $B_p \cdot A_c$ are also equal.

Bandpass filter 23 is designed to pass only frequencies in the range BW to 2BW and therefore the only interfering component which it passes is half the spectrum of $A_c \cdot B_c$. Under the worst case conditions, the resulting signal-to-interference power ratio is 8:1 as shown in FIG. 2B. Assuming independent Rayleigh fading, the average signal-to-interference power ratio demodulator 24 is 20.4:1.

If f.m. modulation is used with an rms index of $\Phi$, where $\Phi$ is greater than 1, the signal-to-interference ratio at passband can be shown to be $$\frac{S}{I}=\sqrt{\frac{2\pi}{3}}\rho\Phi^3=29.5\Phi^3 \quad (1)$$

where $\rho$ is the power ratio of the signal-to-interference into the demodulator. For further discussion of signal-to-interference evaluation, see "Interchannel Interference Considerations in Angle-Modulated Systems," by V. K. Prabhu and L. H. Enloe, published in *The Bell System Technical Journal*, Volume 48, No. 7, pages 2,333 – 2,358, September, 1969. Assuming 10 db clipping and Carson's Rule to estimate the signal bandwidth in terms of the rms index, it can be shown that to achieve at least a 30 db signal-to-interference ratio in a 3kHz audio band, the signal bandwidth BW must be greater than or equal to 67.5kHz with a resulting transmission bandwidth of 2BW or 135kHz.

2. MULTIPLE BRANCHES HAVING WIDELY SEPARATED TRANSMISSION BANDS

Figure 3:
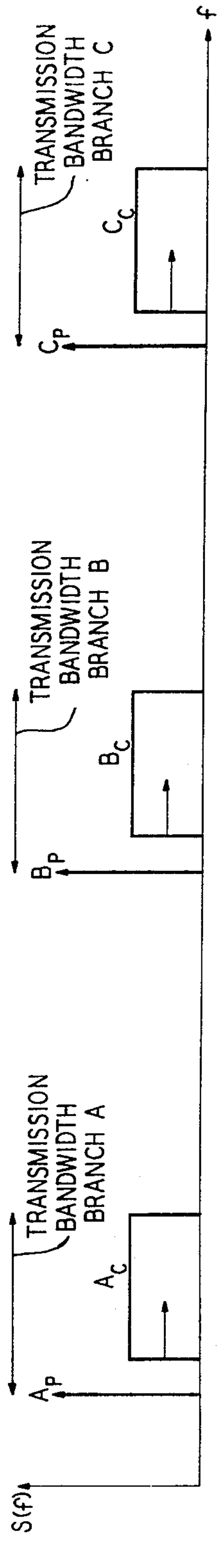

A diversity system as shown in FIG. 1 having any number of branches may be appropriately arranged simply by widely separating the pilot and modulated carrier pairs from each other. Such a spectral arrangement is illustrated in FIG. 3. Each pilot, such as $A_p$, is separated from the modulation $A_c$ of the same branch by a common frequency so that the difference frequency component derived from each pair is the same. The bands of the branches are separated by more than their individual bandwidths, and thus there is no danger of interference from components due to cross modulation. The total transmission bandwidth per branch is not significantly greater than the signal bandwidth and the system provides maximal ratio transmitter diversity so long as the pilot and carrier of each individual branch are within a common phase coherent bandwidth. If the frequency space between the diversity bands is to be used for other stations, the reception at antenna 21 must be comb filtered so that only the desired bands, A, B, C . . . are passed to mixer 22. Furthermore, if the frequency separation between the bands exceeds the phase coherent bandwidth, separate transmitting antennas are not required since the arrangement constitutes frequency diversity.

3. FOUR BRANCHES WITH MODULATION ON CERTAIN PILOTS

A diversity system operating with specifically arranged spectra in accordance with the present invention can be utilized with any number of diversity branches, but the number of cross modulation products increases as a square of the number of branches while there is only one desired product for each individual signal pair. This factor complicates the selection of the appropriate spectral arrangement in a system having a very large array.

Figure 4A:
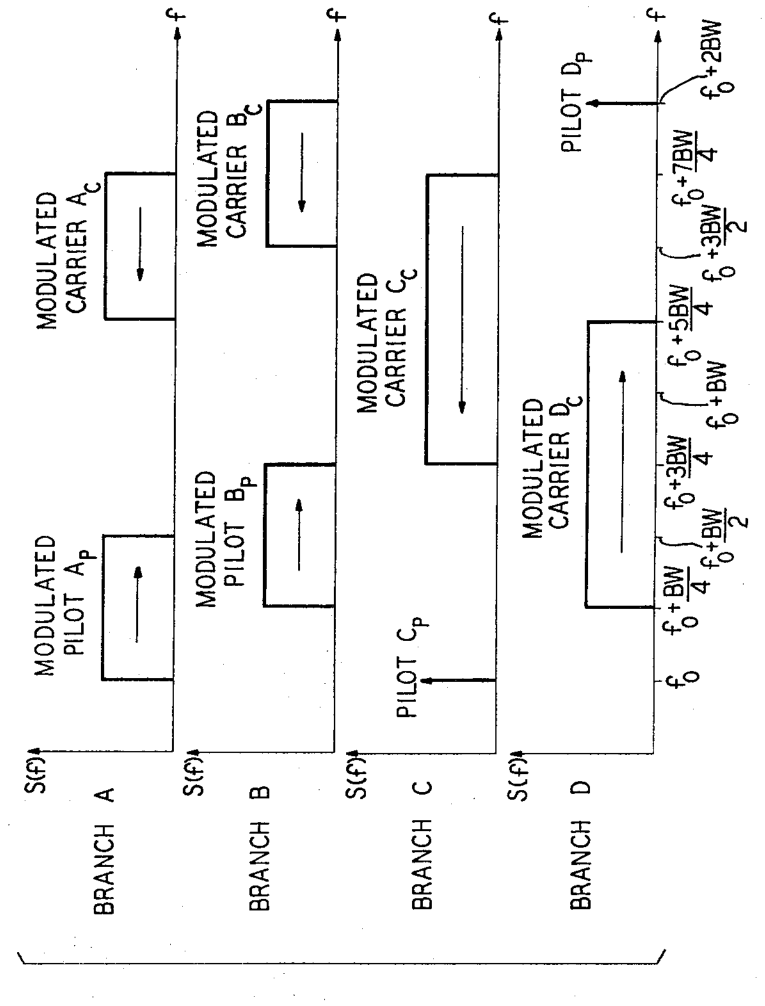

FIG. 4A illustrates a specific spectral arrangement of the output signals in a four branch system as shown in FIG. 1. This arrangement conserves bandwidth while providing high order (greater than two branch) diversity and avoids the comb filter required in systems using widely separated bands.

Some branches have the intelligence modulated on the carrier while others have the intelligence modulated in part on the carrier and in part on the pilot. In branches A and B, half of the intelligence modulation is placed on the pilot whereas the entire intelligence is modulated on the carrier in branches C and D. The spectra are chosen so that the difference frequency component between any pilot and carrier of the same pair is identical.

Though any form of modulation may be used, the relative sense of frequency excursion in an FM system would be as indicated by the arrows in the modulation bands. The difference frequency passband, PB, extends from ¾ BW to 7/4 BW.

Figure 4B:
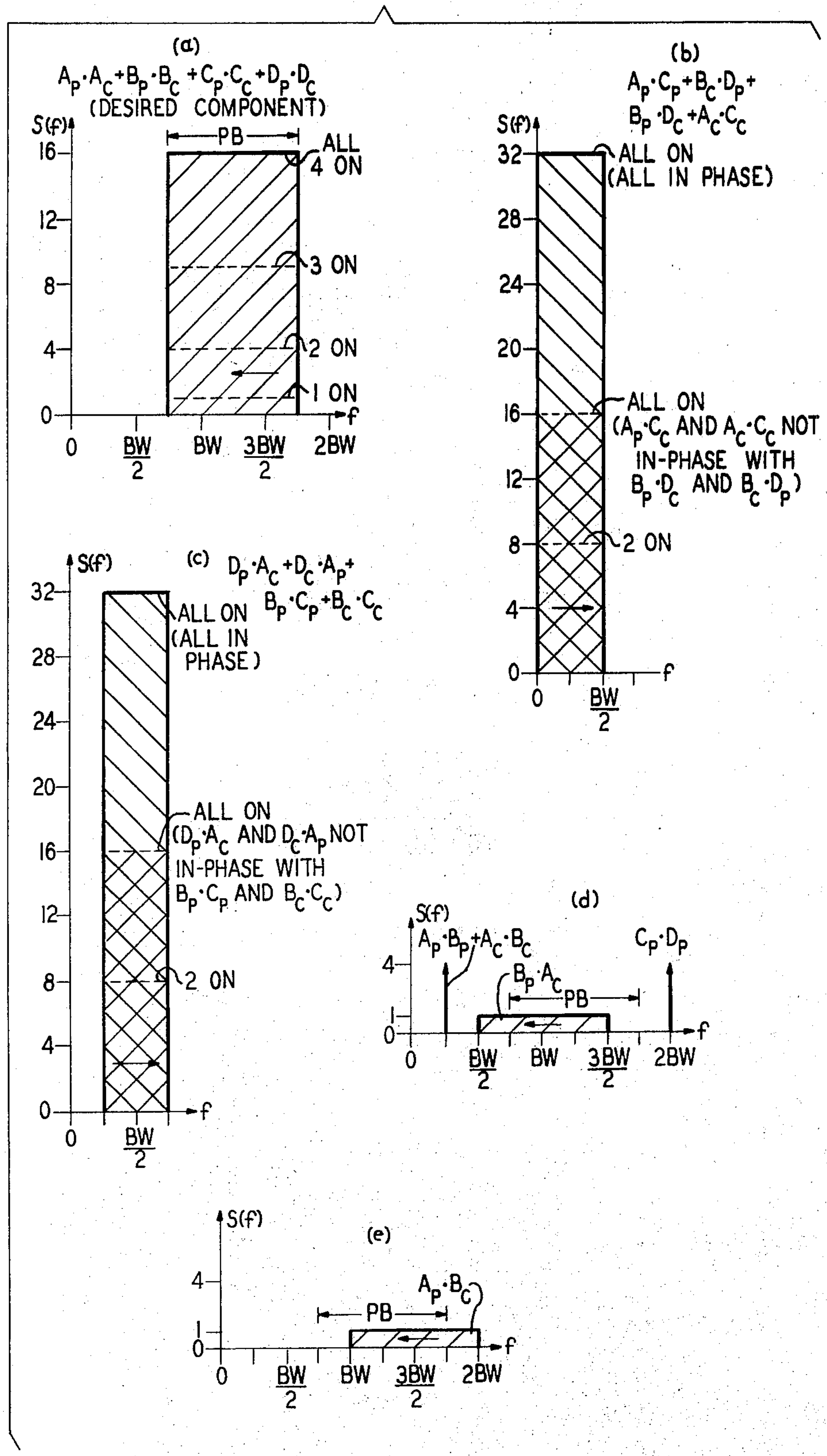
Figure 4B:
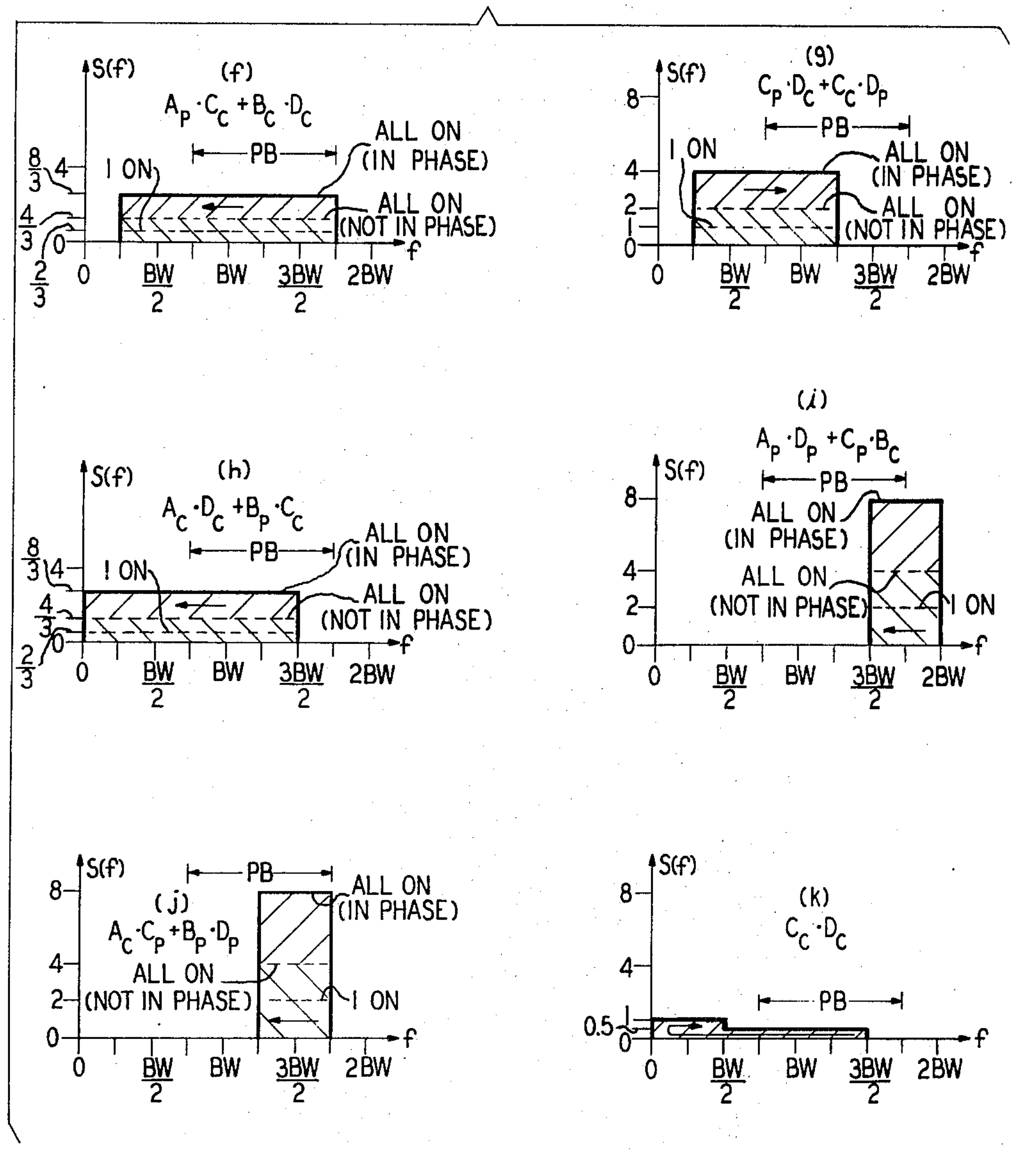

Assuming the signal strength of all branches to be equal, the various intermodulation components resulting from the mixing of the spectra in FIG. 4A are shown in the graphs of FIG. 4B normalized to the spectral density of the output signal from a single branch. The desired signal is the sum of the products of the difference frequency components of each branch: $A_p{\cdot}A_c + B_p{\cdot}B_c + C_p{\cdot}C_c + D_p{\cdot}D_c$.

Graph (a) indicates the signal strength of the desired component. Graph (b) shows the out-of-band interference product of $A_p{\cdot}C_p + B_c{\cdot}D_p + B_p{\cdot}D_c + A_c{\cdot}C_c$. This product is, of course, not passed by filter 23. Likewise, the interference product of $D_p{\cdot}A_c + D_c{\cdot}A_p + B_p{\cdot}C_p + B_c{\cdot}C_c$ is outside the passband as illustrated in graph (c). In addition, out-of-band products $A_p{\cdot}B_p + A_c{\cdot}B_c$ and $C_p{\cdot}D_p$ are illustrated in graph (d).

As can be seen from the remaining part of graph (d) and graphs (e) through (k), each of the individual in-band interferences are significantly below the strength of the desired signal. It is noted that any one or all of the branches may be off (of negligible level), under certain circumstances and hence, the relative strengths of the desired signal of graph (a), as well as the strengths of the interfering products of graphs (b) through (k) would be accordingly reduced from the "all on" condition as indicated by the notations "1 on," "2 on," and "3 on."

For some components, the relative interference power depends upon the phase relationship between other components. In such cases, the relative phases between the components may be random, that is, uniformly distributed from 0 to $2\pi$ radians, in which case the average total power is the sum of the component powers. Alternatively, the components may all be in-phase, in which case the component voltages add. The graphs of FIG. 4B also indicate by appropriate notation the relative strength of the interfering components under varying conditions of phasal relationship. By graphically adding powers of the independent interfering components, it is evident that even in the rare worst case, where all branches have equal strength, and are also in-phase, the desired signal component illustrated in graph (a) is still stronger than the total interference within the passband PB. This allows the capture effect of an f.m. signal to enhance the reception in all cases.

4. MULTIPLE BRANCHES HAVING SLIGHTLY DISPLACED SPECTRA

Figure 5:
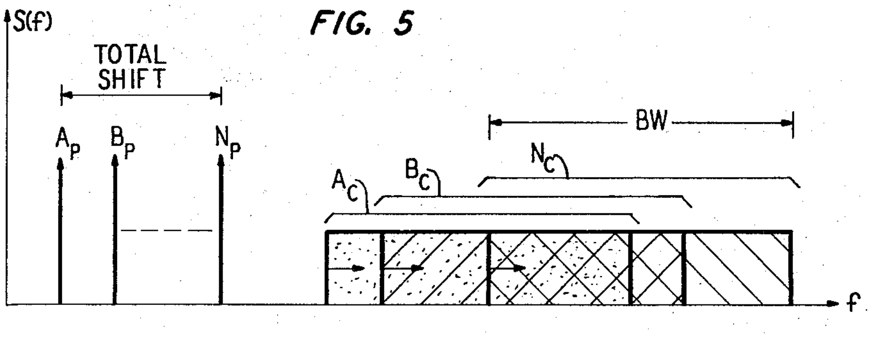

In a multiple branch system the spectra may be arranged so that each pilot and modulated carrier pair is shifted by at least twice the audio bandwidth from the corresponding frequency of the previous branch. The spectra of transmission from an N-branch transmitter as shown in FIG. 1 is illustrated in FIG. 5, and each spectrum has the same shape. The frequency shifts between successive pairs are made unequal to prevent interference components from adding in-phase.

The total frequency shift from one end of the diversity array to the other is less than the frequency space between any pilot and its modulated carrier band. This prevents cross products of two pilots from falling within the output passband of the desired component. It is noted that, as in all other cases, the difference frequency components are the same for each branch. Therefore, by using frequency feedback demodulation and reducing the index to a small value ($<\pi/2$), so that the bandwidths of all components are approximately twice the audio bandwidth, the loop filter in the frequency feedback demodulator can separate the desired component from the interfering components. U.S. Pat. No. 2,429,504, issued to M. Ziegler in 1947, discloses such a feedback arrangement in a selection diversity system without pilots. The resulting bandwidth requirement of an M branch system utilizing this displaced spectral arrangement is $[4M(f_a) + BW]$, where $f_a$ is the highest audio frequency, M is the number of branches and BW is the signal bandwidth of the f.m. wave.

Figure 6:
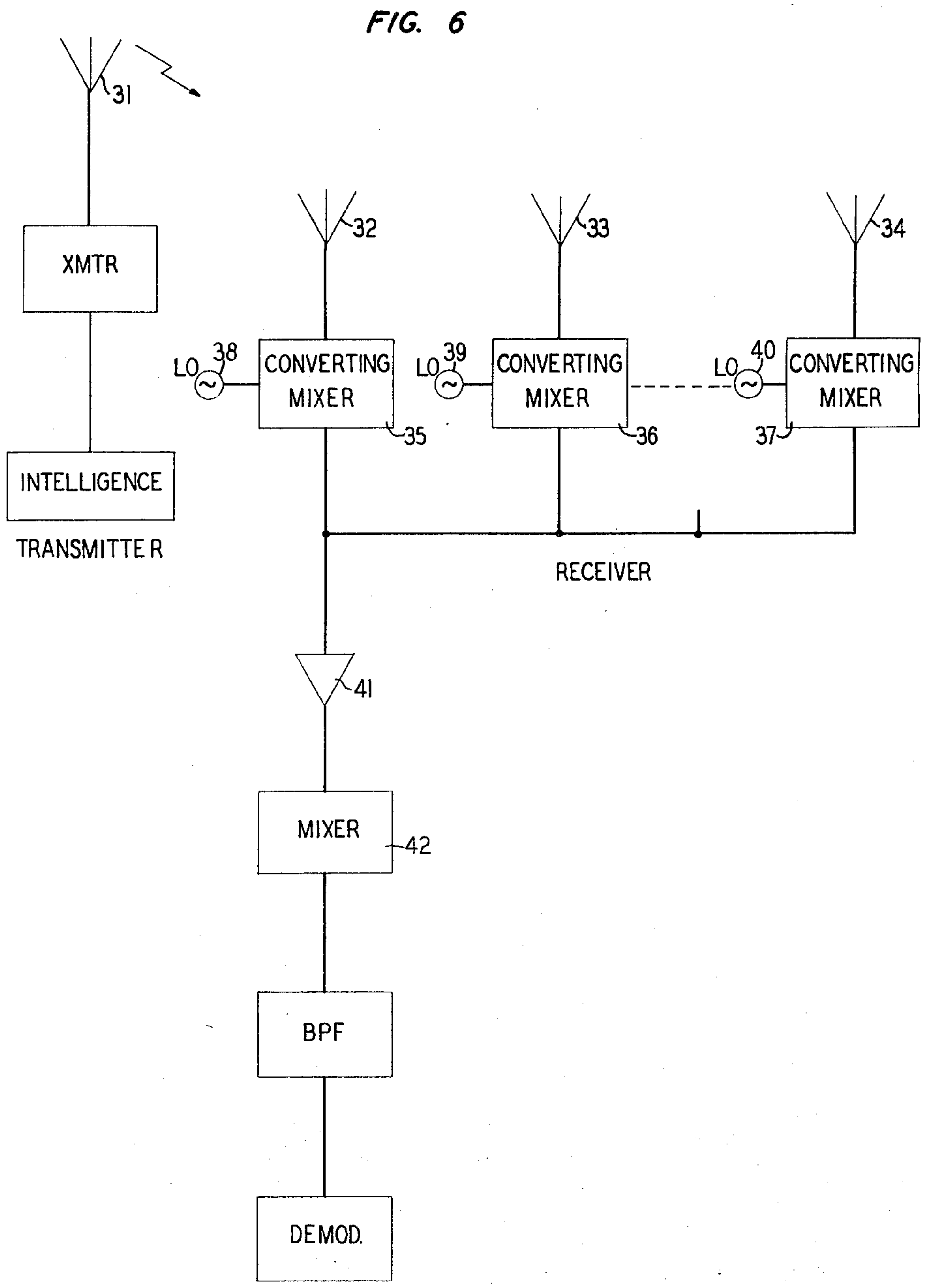
FIG. 6 is a block diagram of an N-branch receiver diversity system for use in accordance with the invention.

The principles of the invention may also be utilized in a system, such as shown in FIG. 6, with a diversity array located at the receiver. The modulated carrier and pilot pair is radiated by antenna 31 and received by the antennas 32 through 34 of the N-branch array. The pilot-signal pairs arriving at individual converting mixers 35 through 37 each have a distinctive and indeterminate phase displacement. Each of the pairs is mixed in converters 35 through 37 with a unique local oscillator signal which is selected to form output pairs having frequency spectra equivalent to those radiated by the transmitter in the transmission diversity system of FIG. 1.

The appropriately distributed pairs are combined and amplified by amplifier 41 and applied to mixer 42, which operates identically to mixer 22 in FIG. 1.

The difference frequency components produced by mixer 42 will produce a coherent signal in which interfering products are suppressed if local oscillators 38 through 41 are properly adjusted to produce the prescribed spectra at the output of converting mixers 34 through 37, respectively. Most of the spectral arrangements suitable for transmission diversity can be applied to the receiver diversity embodiment.

In all cases it is to be understood that the above-described spectral arrangements are merely illustrative of a small number of the many possible applications of the principles of the invention. Numerous and varied other arrangements in accordance with these principles may be readily devised by those skilled in the art without departing from the spirit and scope of the invention.

What is claimed is:

1. A diversity transmission system comprising means for generating a plurality of branch outputs, each branch output consisting of a pair of signals, the difference frequency component between the two signals of any pair being identical for all branch outputs, means for applying identical intelligence to each branch output by modulating at least one signal of the pair, mixing means for simultaneously beating together all of the signals of all of the branch outputs to produce difference frequency products among all of the signals, and modulation receiving means tuned to a frequency band containing the identical difference frequency component for detecting the modulation on the difference products derived from two signals of the same branch output, exclusive of the difference products derived from signals of different branch outputs, 2. A diversity transmission system as claimed in claim 1 wherein said means for generating a plurality of branch outputs is arranged to produce a distinct spectrum for each of said plurality of branch outputs.

3. A diversity transmission system as claimed in claim 1 wherein said means for applying intelligence includes means for applying frequency modulation with a selected f.m. index to at least one signal of each signal pair, and said modulation receiving means includes a passband filter tuned to pass said identical difference frequency component and an f.m. detector in which the capture effect suppresses difference frequency products derived from signals of different signal pairs.

4. A diversity transmission system as claimed in claim 3 wherein said means for applying intelligence includes means for modulating the intelligence in part on one signal of said pair of signals and in part on the other signal of said pair of signals.

5. A diversity transmission system in accordance with claim 1 wherein said mixing means produces in-phase difference frequency products of the two signals of each signal pair and randomly phased difference products of two signals in different signal pairs, whereby the randomly phased products are either outside the passband of said modulation receiving means or significantly weak relative to the in-phase product.

6. A diversity transmission system in accordance with claim 1 wherein the spectrum of each of the plurality of signal pairs is selected so that the cross modulation products of all signals, exclusive of those products of the two signals of any single signal pair, are outside the passband defined by the product of the signals of the single signal pair or are significantly weaker than the products of the signals of the single signal pair.

7. A diversity communication system comprising, a plurality of branches, means for applying to each branch a pilot signal and a carrier signal, the difference frequency component between the pilot and carrier on each branch being identical for all branches, means for applying identical intelligence to each branch by modulating at least one of the two signals, means for simultaneously beating together all of the pilots and carriers of the plurality of branches to produce difference frequency components, means for suppressing the undesired difference frequency components produced by beating together signals other than a pilot and carrier of the same branch.

means for detecting the modulation from the difference frequency components produced by beating a pilot and carrier of the same branch.

8. A diversity communication system as claimed in claim 7 wherein said means for applying to each branch a pilot signal and a carrier signal is arranged to produce a distinct spectrum for each branch.

9. A diversity communication system as claimed in claim 8 wherein the spectra are selected so that the cross modulation products of all of the pilots and carriers of the plurality of branches, exclusive of those products of the pilot and carrier of the same branch, are significantly removed in at least frequency or power from those products of a pilot and carrier of any one same branch.

10. A diversity communication system as claimed in claim 7 wherein the frequency of the pilot of a first branch is below the frequency of the carrier of the first branch and the frequency of the pilot of a second branch is above the frequency of the carrier of the second branch so that the spectra of the two branches are reversed, and said means for suppressing the undesired components includes a bandpass filter tuned to pass only the difference frequency and its associated modulation and a modulation detector which suppresses the difference frequency products of corresponding signals in the two branches.

11. A diversity communication system as claimed in claim 7 wherein the spectrum produced by each pilot and carrier pair is widely separated in frequency from the spectrum produced by all other pilot and carrier pairs and said means for suppressing the undesired components includes a bandpass filter tuned to pass only the difference frequency and its associated modulation.

12. A diversity communication system as claimed in claim 7 wherein the spectrum produced by each pilot and carrier is displaced in frequency from the spectrum of the pilot and carrier of any other branch by an amount of at least twice the audio bandwidth, and said means for suppressing the undesired components includes a bandpass filter tuned to pass only the difference frequency and its associated modulation.

13. A diversity communication system as claimed in claim 7 wherein said means for applying identical intelligence includes means for frequency modulating at least one of the two signals in each branch.

14. A diversity communication system as claimed in claim 13 wherein said means for applying identical intelligence includes modulating the intelligence in part on one signal of a pair of signals and in part on the other signal of said pair.

15. A diversity communication system as claimed in claim 7 wherein said means for applying to each branch a pilot signal and a carrier signal is provided at a first station having a transmitter for each of said plurality of branches and antenna means for radiating the output of each transmitter on a diverse transmission path, and said means for beating all of the pilots and carriers of the plurality of branches is provided at a second station having a single antenna and a single mixer connected to said single antenna.

16. A diversity communication system as claimed in claim 7 wherein said means for applying to each branch a pilot signal and a carrier signal is provided by an individual local oscillator producing an output of preselected frequency, each oscillator output being mixed individually with the pilot and the carrier of a single branch to produce a converted output having a desired spectrum, and wherein said means for beating all of the pilots and carriers includes a single mixer into which all of the converted outputs are fed.

17. A diversity transmission system of the type having a plurality of branches, means for applying to each branch a pilot signal and a carrier signal with identical intelligence modulated on each branch and means for mixing the pilot signal and the carrier signal of each branch together to form a difference frequency component between them, characterized in that, said means for mixing is common to all branches and said means for applying a pilot signal and a carrier signal is arranged to provide a distinct spectrum for each branch, the spectra being selected so that all of the difference frequency components from said common mixing means which are derived from a pilot signal and a carrier signal of the same branch are identical and are significantly removed in at least frequency or power from all of the other difference frequency components from said common mixing means.

* * * * *